United States Patent [19]

Bowers

[11] Patent Number: 4,612,686

[45] Date of Patent: Sep. 23, 1986

[54] STRAP TIGHTENER

[75] Inventor: Thomas Bowers, Toledo, Ohio

[73] Assignees: Arthur Bollinger, Toledo, Ohio; Fred C. Durst, Jr., Foreside, Me.; Emch, Schaffer, Schaub & Porcello Co., Toledo, Ohio

[21] Appl. No.: 640,136

[22] Filed: Aug. 13, 1984

[51] Int. Cl.[4] .............................................. A44B 21/00
[52] U.S. Cl. ....................................... 24/71.1; 254/232
[58] Field of Search .................. 24/71.1, 71.2, 115 H, 24/32, 68 R, 68 CD, 68 CT; 254/231, 232, 235, 236; 256/37

[56] References Cited

U.S. PATENT DOCUMENTS

| | | | |
|---|---|---|---|
| 299,795 | 6/1884 | Jones et al. | 254/236 X |
| 1,138,127 | 5/1915 | Loftus | 256/37 |
| 1,185,464 | 5/1916 | Baker | 254/232 |
| 1,316,294 | 9/1919 | Freed | 254/232 |
| 1,555,351 | 9/1925 | Boynton | 24/71.2 |
| 2,075,239 | 3/1937 | Strange | 254/231 X |
| 2,449,031 | 9/1948 | Woodson | 24/71.1 |
| 2,547,370 | 4/1951 | Boyer . | |
| 2,621,020 | 12/1952 | Call . | |
| 2,634,471 | 4/1953 | Lacher | 24/71.1 |
| 2,679,670 | 6/1954 | Griswold . | |
| 3,099,055 | 7/1963 | Huber . | |
| 3,128,516 | 4/1964 | Halvarson . | |
| 3,467,994 | 9/1969 | Evans | 24/71.2 |
| 3,574,246 | 4/1971 | Norton . | |
| 3,749,366 | 7/1973 | Brucker . | |
| 3,811,655 | 5/1974 | Foster . | |
| 3,866,272 | 2/1975 | Prete . | |
| 4,094,044 | 6/1978 | Coker . | |
| 4,118,833 | 10/1978 | Knox et al. . | |
| 4,154,427 | 5/1979 | Hofmann . | |
| 4,190,234 | 2/1980 | Coleman | 254/232 |
| 4,367,862 | 1/1983 | McGregor | 24/68 CT |
| 4,395,796 | 8/1983 | Akaura et al. . | |

Primary Examiner—William E. Lyddane
Assistant Examiner—James R. Brittain
Attorney, Agent, or Firm—Emch, Schaffer Schaub & Porcello Co.

[57] ABSTRACT

A strap tightener is disclosed. The tightener includes a base member having edges for guiding a pair of threaded members. A drive member is mounted between the threaded members and a keeper is located adjacent the base for maintaining the base generally parallel to the length of strap during tightening.

7 Claims, 7 Drawing Figures

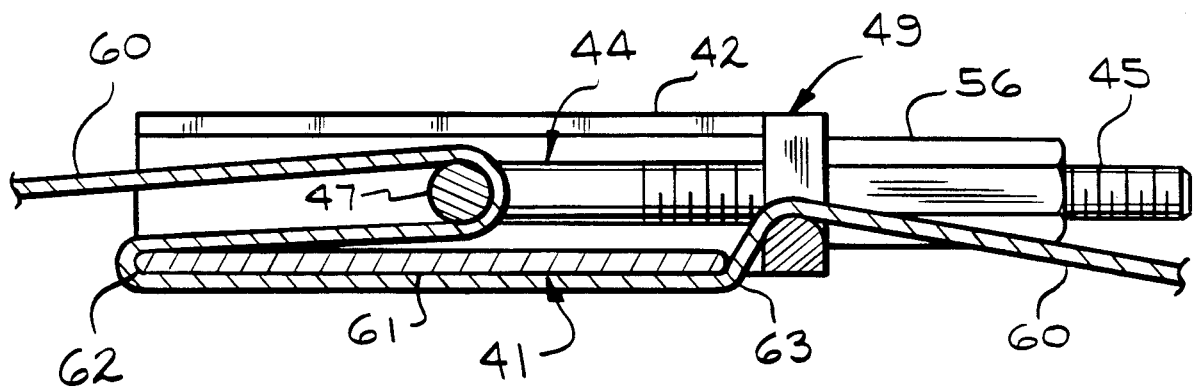
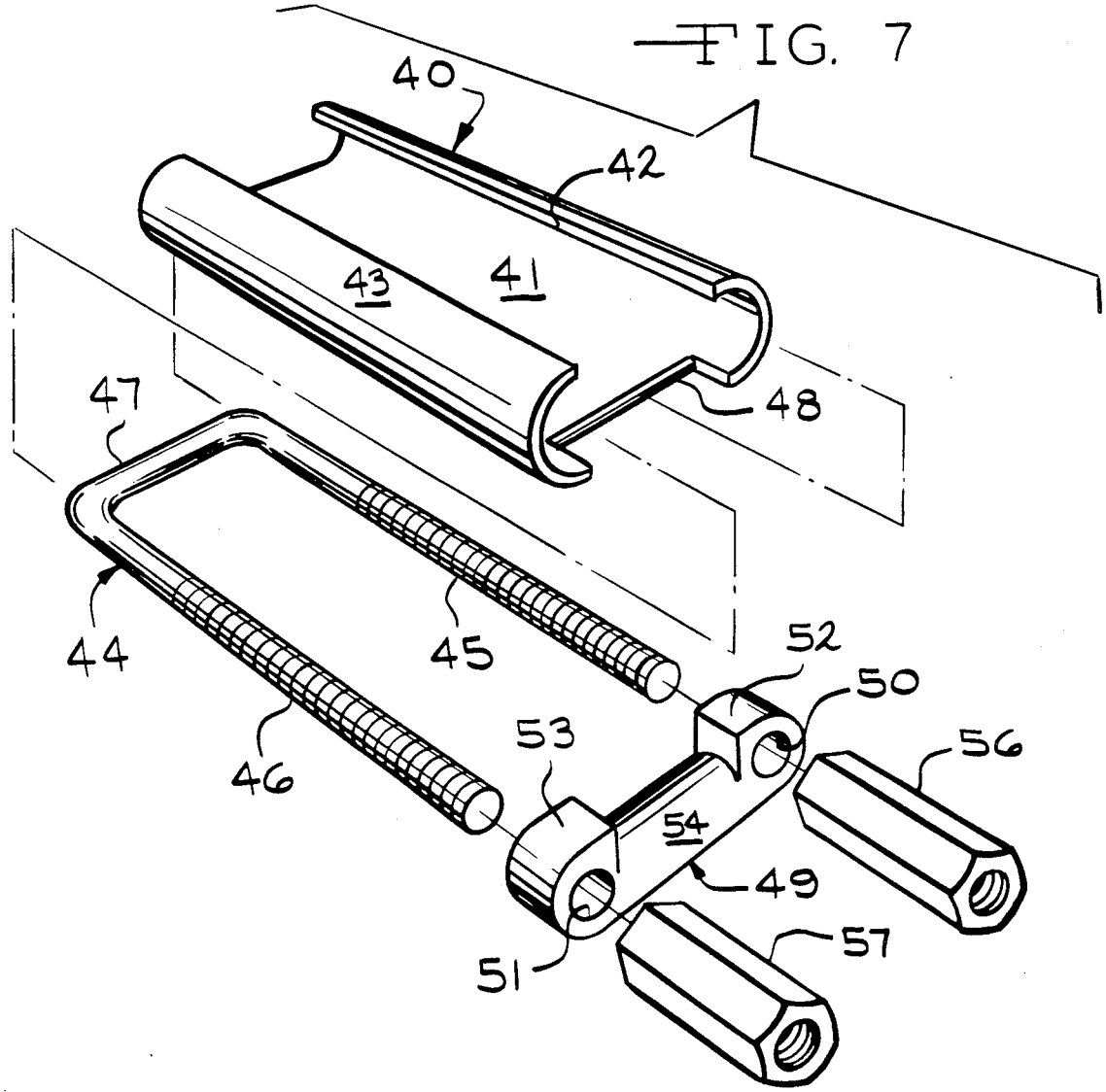

STRAP TIGHTENER

BACKGROUND OF THE INVENTION

Strap tighteners are used in many applications. One major use of a strap tightener is in connection with metal strapping used in the shipment of cargo. Such cargo shipments can be aboard ships, in railway cars or trucks. In those situations, after the strapping has been initially tensioned, it can become loosened by vibration of the load occasioned by heavy seas and the like. In this situation, it is very desirable to tighten the metal strapping to protect the cargo.

The prior art used strap tightening devices which in some cases were as simple as wood cribbing and in other cases rather complicated ratchet devices. Often, the prior art ratchet devices were both expensive and difficult to use.

SUMMARY OF THE INVENTION

The present strap tightener may be installed on metal strap during the initial installation if the cargo is exceptionally valuable. In this situation, the strap tightener is already in place if the strap should become loose during transit.

In other situations, the strap tightener is only installed if an individual strap becomes loose during transit.

The strap tightener, according to the present invention, includes a base member and at least two longitudinally extending threaded members which are positioned in an opposed relationship on the base member. At least one drive member engages the strap and is operatively connected to the opposed threaded members. A keeper which may be a separate member or a part of the base member engages the strap and maintains the base in a generally parallel relationship to the length of strap.

DESCRIPTION OF THE DRAWINGS

FIG. 6 is a longitudinal cross-sectional view of the strap tightener shown in FIG. 5; and FIG. 7 is an exploded view of the strap tightener embodiment shown in FIGS. 5 and 6.

DETAILED DESCRIPTION OF THE PREFERRED EMBODIMENTS

Figure 1:
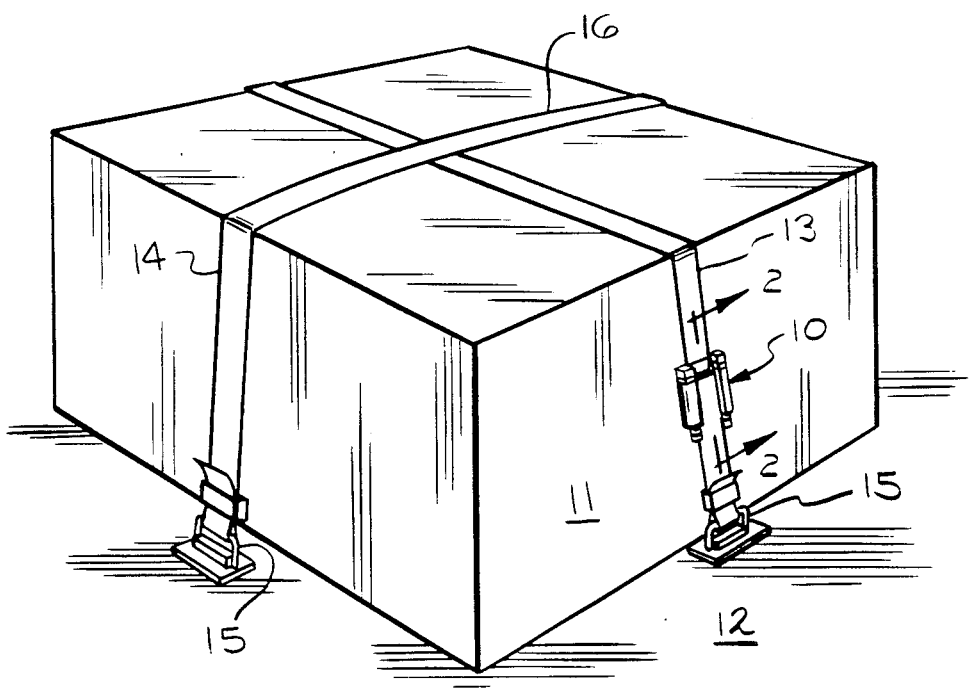
FIG. 1 is a perspective view of metal strapping used to hold down a cargo box in a preset position. A strap tightener, according to the present invention, is shown on one length of strap.

A strap tightener, according to the present invention is indicated in FIG. 1 by the reference number 10. A cargo box 11 is secured to the floor 12 by metal straps 13 and 14 connected to D-ring assemblies 15. The strap 14 has a bowed portion 16. Such a bowing or loosening of the strapping often occurs during transit. The strap tightener 10, according to the present invention, has been installed on the metal strap 13. The strap tightener 10 has retensioned or retightened the strap 13 to its proper tension.

Figure 2:
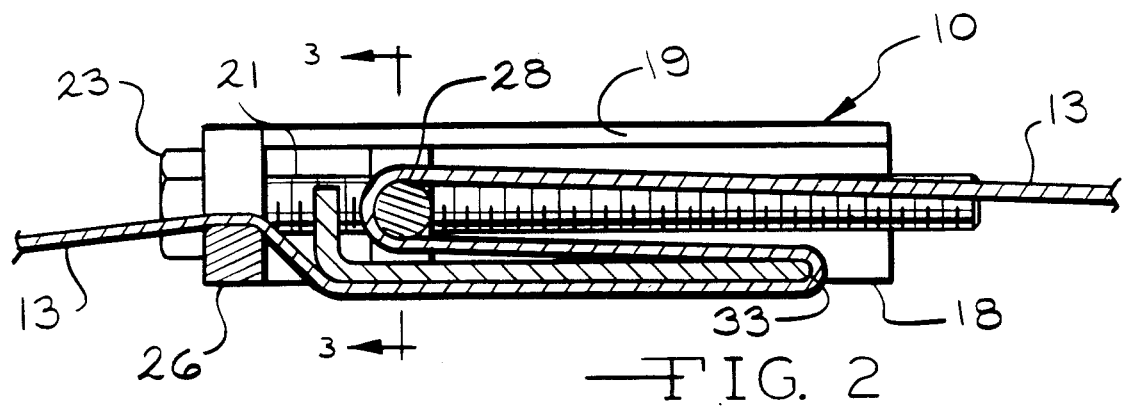
FIG. 2 is a cross-sectional view of the strap tightener shown in FIG. 1, taken on an enlarged scale.
Figure 3:
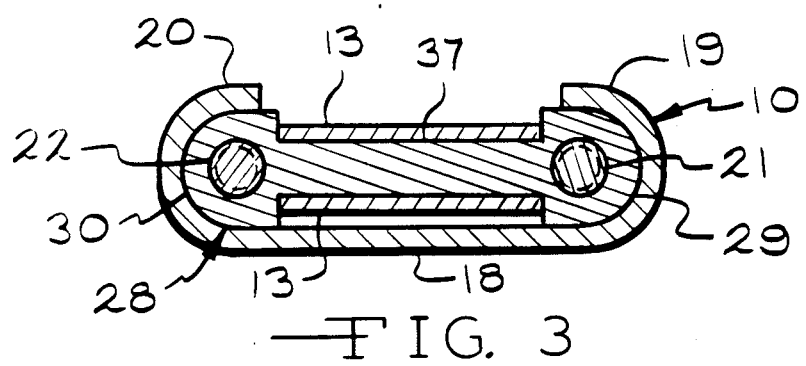
FIG. 3 is a cross-sectional view taken along the line 3—3 of FIG. 2.
Figure 4:
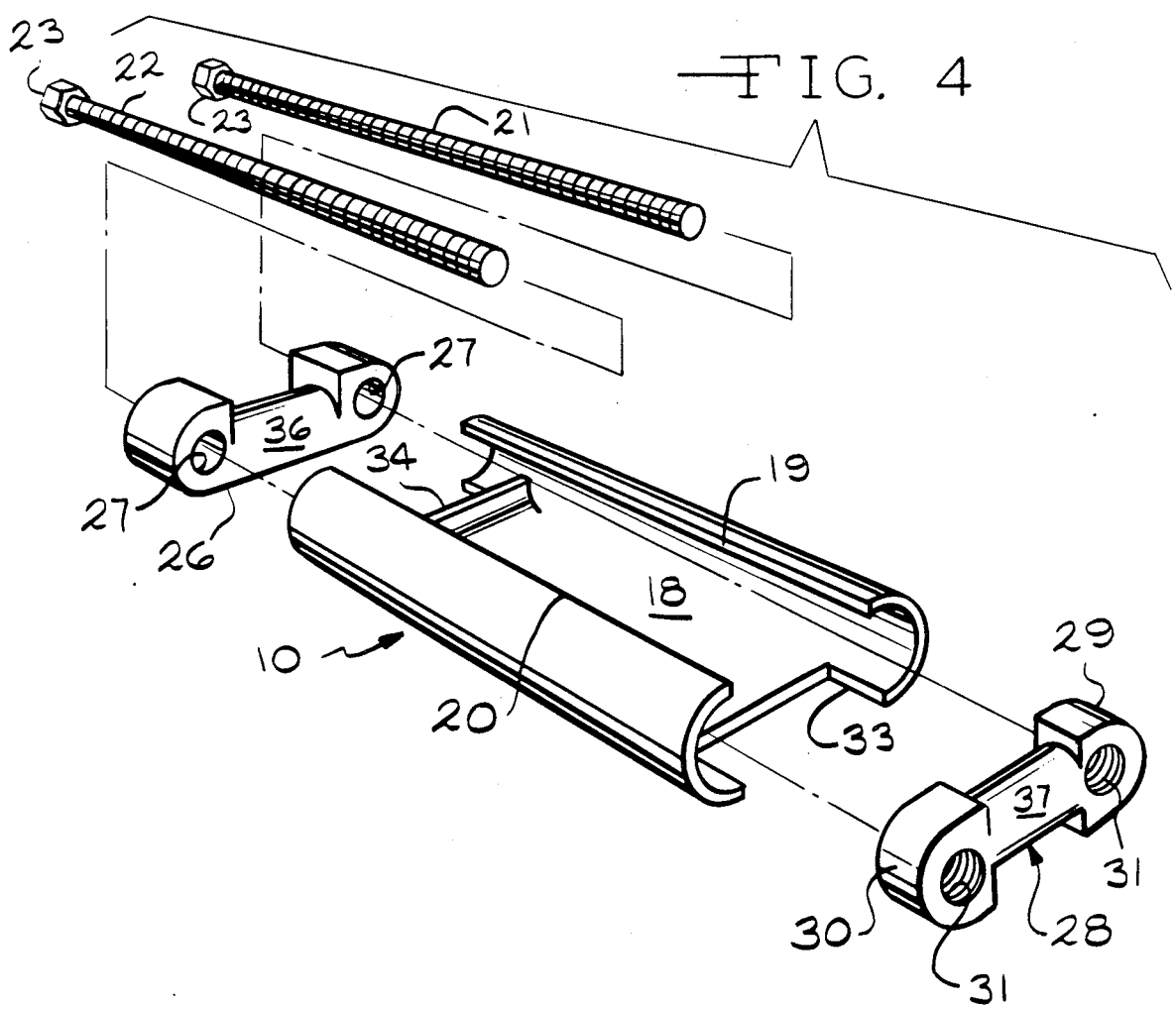
FIG. 4 is an exploded view of the strap tightener shown in FIGS. 1-3.

The strap tightener 10, referring to FIGS. 2, 3, and 4, includes a longitudinally extending base member 18. The base member 18 includes opposed upstanding sidewalls 19 and 20. The curved sidewalls 19 and 20 receive and guide a pair of opposed longitudinally extending threaded members 21 and 22. The threaded members 21 and 22 include heads 23. A keeper bar 26 is positioned across the longitudinally extending base member 18 and defines opposed openings 27 for receiving the threaded members 21 and 22. A drive member 28 includes curved ends 29 and 30 of a shape complementary to the curved sidewalls 19 and 20 of the base member 18. The drive member 28 also defines threaded holes 31 which receive the threaded members 21 and 22.

The base member 18 of the strap tightener 10 includes a slot 33 at one end and a raised curved portion 34 at the other end.

Preferably the keeper bar 26 has a smooth radiused central portion 36 and the drive member 28 has a smooth radiused central portion 37.

Referring to FIG. 2, in operation, the metal strap 13 is positioned over the keeper bar 26, passes beneath the base member 18 and into the slot 33 at the other end of the base member 18. The metal strap 13 then is looped around the central portion 37 of the drive member 28. In the embodiment shown in FIGS. 1-4, rotation of the threaded members 21 and 22 moves the drive member 28 along a path defined by the base member 18 and the sidewalls 19 and 20, thereby tightening the metal strap 13.

Figure 5:
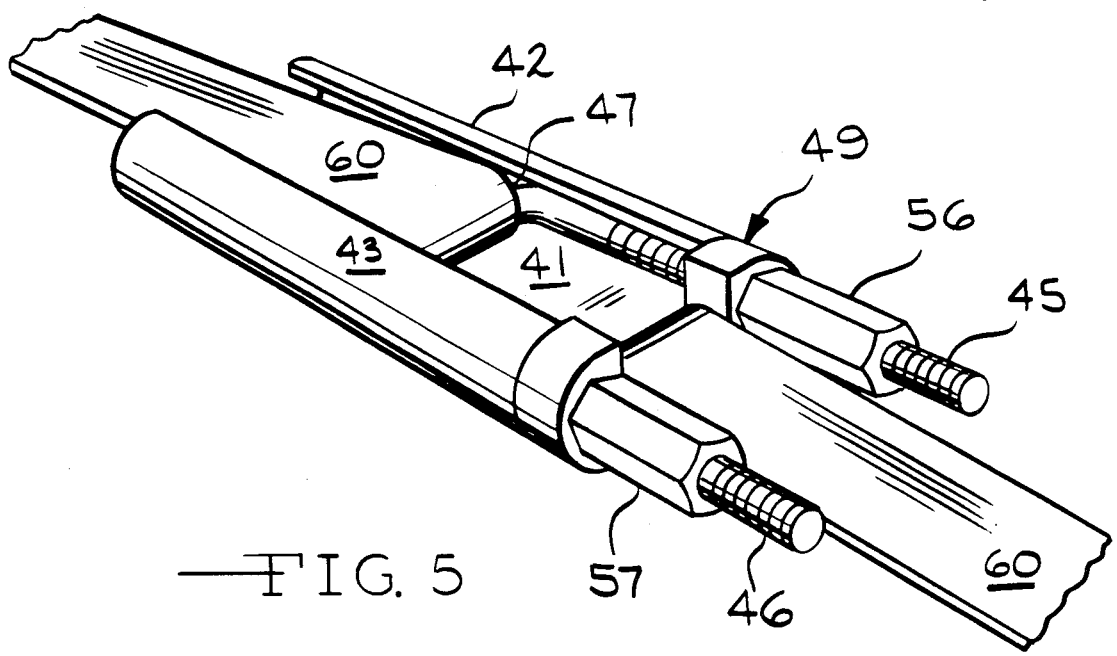
FIG. 5 is a perspective view of another embodiment of a strap tightener, according to the present invention.

Referring to FIGS. 5-7, another embodiment of a strap tightener, according to the present invention is disclosed.

A strap tightener 40 includes a longitudinally extending base member 41 having upstanding, curved sidewalls 42 and 43. The base member 41 defines a slot 48 at one end.

A U-bolt 44 includes opposed longitudinally extending threaded members 45 and 46 and an integral crossbar or drive member 47. As shown in FIG. 5, the U-bolt 44 is received by the base member 41 with the curved sidewalls 42 and 43 receiving and guiding the threaded members 45 and 46.

A keeper bar 49 defines opposed openings 50 and 51 which receive the threaded members 45 and 46 of the U-bolt 44. The keeper bar 49 includes curved ends 52 and 53 together with a radiused center portion 54. Nuts 56 and 57 are threaded on the ends of the threaded members 45 and 46 and position the keeper bar 49 adjacent the end of the base member 41 as shown in FIGS. 5 and 6.

During operation of the strap tightener 40, a length of metal strap 60 is passed around the integral drive member 47 of the U-bolt 44 and then around the bottom surface 61 of the base member 41. As best shown in FIG. 6, the edges 62 and 63 of the base member 41 are radiused to present a smooth surface to the metal strap 60. The metal strap 60 passes upwardly through the slot 48 defined by the strap tightener 40 and over the radiused central portion 54 of the keeper bar 49. To tighten the strap 60, the nuts 56 and 57 are rotated to move the drive member 47 to the right as shown in FIG. 6.

Other modifications and changes can be made to the strap tightener disclosed without departing from the scope of the following claims.

What I claim is:

1. A strap tightener for tightening a length of strap intermediate its ends comprising, in combination, a longitudinally extending base member, opposed guide walls defined on opposed sides of said base member, two longitudinally extending threaded members positioned adjacent said guide walls, said guide walls receiving and guiding said threaded member, a drive member connected to and extending between said threaded members, and a keeper means adjacent said base member and positioned immovably relative to said base member for maintaining said base member generally parallel to the length of strap, said keeper means comprising a keeper bar extending between said longitudinally extending threaded members, said keeper bar defining opposed openings for receiving said threaded members, said base member and said keeper bar defining a recess for receiving such strap, said drive member being moved along said base to tighten such strap.

2. A strap tightener, according to claim 1, wherein said drive member is integrally connected to said threaded members and extends between said threaded members.

3. A strap tightener, according to claim 1, wherein said drive member defines spaced threaded holes, said spaced threaded holes receiving respective ones of said longitudinally extending threaded members.

4. A strap tightener according to claim 3, wherein said longitudinally extending threaded members include heads at one end, said heads engaging said keeper means.

5. A strap tightener according to claim 1 including nut members threadedly mounted on said longitudinally extending threaded members adjacent said keeper bar.

6. A strap tightener for tightening a length of strap intermediate its ends comprising, in combination, a base member having a flat base and upstanding curved sidewalls, a pair of opposed longitudinally extending threaded members adjacent to and received by said curved sidewalls, said flat base of said base member defining a recess at one end, a keeper bar positioned immovably relative to said base member adjacent said recess and defining opposed openings for receiving said threaded members, said recess of said flat base and said keeper bar defining a passageway for such strap and a drive member having opposed threaded holes for receiving said longitudinally extending threaded member whereby rotation of said threaded members moves said drive member to tighten such strap.

7. A strap tightener for tightening a length of strap intermediate its ends comprising, in combination, a base member having a flat base and upstanding curved sidewalls, a "U" shaped member having threaded legs positioned adjacent said upstanding sidewall and an integral drive member connected to said threaded legs, said curved sidewalls receiving and guiding said threaded legs, a keeper bar having opposed openings for receiving said threaded legs positioned immovably relative to said base member, said flat base of said base member defining a recess at one end, said recess of said flat base and said keeper bar defining a passageway for such strap and a pair of nuts mounted on said threaded legs adjacent said keeper bar, whereby rotation of said pair of nuts moves said "U" shaped member to tighten such strap.

* * * * *